US006832027B2

(12) United States Patent
Wada et al.

(10) Patent No.: US 6,832,027 B2
(45) Date of Patent: Dec. 14, 2004

(54) INTERLEAVERS FOR AWGS

(75) Inventors: Kazumi Wada, Lexington, MA (US); Lionel C. Kimerling, Concord, MA (US); Hermann A. Haus, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 116 days.

(21) Appl. No.: 10/323,355

(22) Filed: Dec. 18, 2002

(65) Prior Publication Data

US 2003/0128928 A1 Jul. 10, 2003

Related U.S. Application Data

(60) Provisional application No. 60/341,704, filed on Dec. 18, 2001.

(51) Int. Cl.$^7$ ................ G02B 6/34; G02B 6/26
(52) U.S. Cl. ................ 385/37; 385/27; 385/15; 398/84; 398/87
(58) Field of Search .................. 385/14, 15, 24, 385/27, 37, 42, 46, 48; 398/43, 48, 79, 84, 87

(56) References Cited

U.S. PATENT DOCUMENTS

| | | | |
|---|---|---|---|
| 5,714,773 A | * 2/1998 | Burrows et al. | 257/82 |
| 6,640,026 B2 | * 10/2003 | Tsuritani et al. | 385/24 |
| 2002/0048065 A1 | * 4/2002 | Shani | 359/127 |
| 2002/0154861 A1 | * 10/2002 | Nara et al. | 385/37 |
| 2003/0194183 A1 | * 10/2003 | Fondeur et al. | 385/37 |

FOREIGN PATENT DOCUMENTS

| | | |
|---|---|---|
| WO | WO 99/08143 | 2/1999 |
| WO | WO 01/05082 | 1/2001 |

OTHER PUBLICATIONS

"Ultra–Compact Si–SiO$_2$ Microring Resonator Optical Channel Dropping Filters," Little et al. *IEEE Photonics Technology Letters*. Apr. 1998. vol. 10, No. 4.

"Wavelength Switching and Routing Using Absorption and Resonance," Little et al. *IEEE Photonics Technology Letters*, Jun. 1998. vol. 10, No. 6.

"Novel AWG Interleaved Filters with a 50 GHz Channel Spacing Exhibiting Hgh 'Figure of Merit' Pass–bands, and low–loss, cross–talk, dispersion, and polarisation sensitivity," Whiteaway et al. *Proceedings of ECOC 2000*. Sep. 2000. p. 25–26.

* cited by examiner

*Primary Examiner*—Akm Enayet Ullah
*Assistant Examiner*—Kevin S. Wood
(74) *Attorney, Agent, or Firm*—Gauthier & Connors LLP

(57) ABSTRACT

A system includes a plurality of AWGs, wherein one of the AWGs receives an input signal. The AWGS are divided amongst a first selective group of the AWGs providing even-numbered channel outputs associated with an even-numbered selection of the input signal, and a second selective group of the AWGs providing odd-numbered channel outputs associated with an odd-numbered selection of the input signal. An interleaver arrangement includes a plurality of ring structures so as to provide appropriate filtering characteristics for the even-numbered channel outputs and odd-numbered channel outputs.

10 Claims, 2 Drawing Sheets

INTERLEAVERS FOR AWGS

PRIORITY INFORMATION

This application claims priority from provisional application Ser. No. 60/341,704 Dec. 18, 2001, which is incorporated herein by reference in its entirety.

BACKGROUND OF THE INVENTION

The invention relates to the field of optical communication, and in particular to interleaver arrangements using more than one ring structures between two AWGs for aiding in crosstalk reduction and narrowing wavelength spacings.

Rapid growth of high-speed, broadband communication has led to a need to increase the capacity of optical communication networks. Wavelength division multiplexing (WDM) systems have key roles in meeting this need. Such networks require a variety of optical components to enable them to directly process light signals. Planar lightwave circuits (PLCs) fabricated using $SiO_2$-based waveguides are being employed as an optical platform for various devices. Arrayed waveguide gratings (AWGs) are superior to other types of wavelength multiplexers/demultiplexers (MUX/DEMUX), such as dielectric multiplayer filters and fiber Bragg gratings in terms of compactness and large channel number. Thus, 16 to 64 channel AWGs have already been marketed and are widely used as MUX/DEMUX in WDM systems employed in communication networks.

Despite of the advantages of AWGs, one of the disadvantages is that in order to achieve WDM systems, there is a need to reduce crosstalks and thus to narrow the wavelength spacings between two channels especially for its application to analog signals. Since the principle of AWGs is constructive interference, the power distribution is always a sinusoidal function. This results in large crosstalks between two channels. The interleaver provides the ability to reduce crosstalk between two channels in AWGs so that wavelength spacings between two channels in the AWGs.

SUMMARY OF THE INVENTION

According to one aspect of the invention, there is provided a system for performing crosstalk in AWGs. The system includes a plurality of AWGs, wherein one of the AWGs receives an input signal. The AWGS are divided amongst a first selective group of the AWGs providing even-numbered channel outputs associated with an even-numbered selection of the input signal, and a second selective group of the AWGs providing odd-numbered channel outputs associated with an odd-numbered selection of the input signal. An interleaver arrangement includes a plurality of ring structures so as to provide appropriate filtering characteristics for the even-numbered channel outputs and odd-numbered channel outputs.

According to another aspect of the invention, there is provided a method of performing crosstalk in AWGs. The method includes providing a plurality of AWGs, wherein one of said AWGs receives an input signal. The AWGS are divided amongst a first selective group of said AWGs providing even-numbered channel outputs associated with an even-numbered selection of said input signal, and a second selective group of said AWGs providing odd-numbered channel outputs associated with an odd-numbered selection of said input signal. The method also includes providing an interleaver arrangement that includes a plurality of ring structures so as to provide appropriate filtering characteristics for said even-numbered channel outputs and odd-numbered channel outputs.

DETAILED DESCRIPTION OF THE INVENTION

The invention provides the function by using one or more ring resonators between two AWGs. By doing so, one AWG outputs odd-numbered channels and the other AWG outputs even-numbered channels. The interleaver acts as a filter in aiding to produce the odd-numbered and even-numbered channel outputs.

Figure 1:
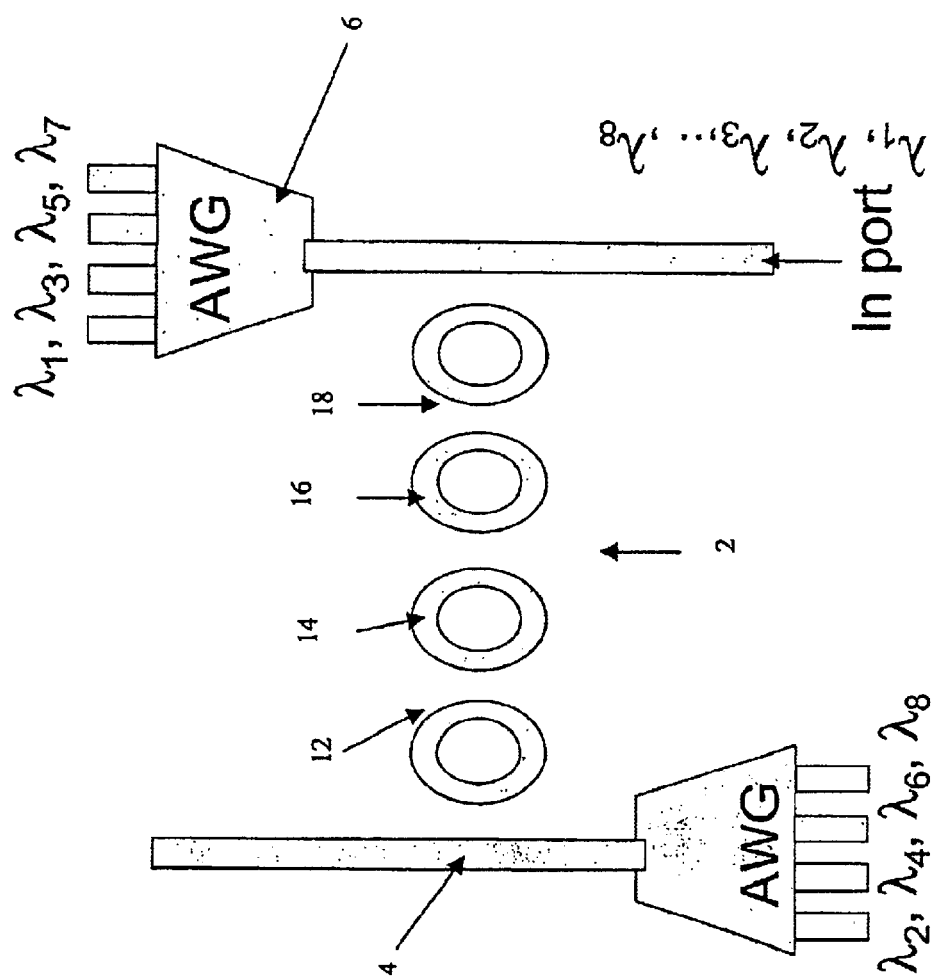
FIG. 1 is a schematic diagram of an exemplary interleaver arrangement.

FIG. 1 is a schematic diagram of an exemplary embodiment of an interleaver arrangement 2 using AWGs 4, 6 in crosstalk. The AWGs 4, 6 are formed using high index contrast (HIC) optics, however, other material systems can be used in accordance with the invention, and are best achieved in the Si materials system. $Si_3N_4$ systems are also applicable for HIC AWGs, although the size is a little larger than that on the Si systems. Silicon oxinitride systems are also applicable for HIC AWGs, although the size is larger than on the $Si_3N_4$ systems.

Crosstalk with adjacent waveguides of −40 dB is required to obtain wide dynamic range. In order to realize such a low crosstalk, the invention uses interleaver filters.

The interleaver arrangement 2 includes ring resonators 12, 14, 16, and 18 to divide a signal group with wavelength spacing of free spectral range into to odd and even output channels with doubled channel spacing. Two AWGs 4, 6 are connected to these even and odd channels of the interleaver arrangement 2. Using this device can significantly reduce crosstalk down to −40 dB. In this embodiment, the interleaver arrangement 2 uses 4 ring resonators 12, 14, 16, and 18 to verify that the filter characteristics fit the desired requirements. However, more or less ring resonators can be used in accordance with the invention. Furthermore, the distances between the waveguide structures of AWGs 4, 6 and ring structures 12 and 18 are equal relative to the distances amongst the ring structures 12, 14, 16, and 18.

The ring resonators 12, 14, 16, and 18 provide better filtering characteristics needed in achieving its task. The issue with standard interleavers in the art is that their filtering characteristics are limited based on the size of the interleaver, frequency of the input signal, and the size of the AWGs 4, 6. Therefore, dividing a signal group with wavelength spacing of free spectral range into odd or even output channels with channel spacing may not be so accurate under certain circumstances. By using smaller ring resonators, such as ring resonators 12, 14, 16, and 18, it accommodates for the deficiencies in a single standard interleaver. Furthermore, the filtering characteristic of smaller ring resonators can approach that of a flat top filter at selected odd and even channel outputs. This produces more reliable and cleaner outputs for each of the channels. A standard interleaver that demonstrates flat top filtering characteristics is ideal, however, impractical under the circumstances. The invention uses ring resonators 12, 14, 16, and 18 to achieve flat top filtering characteristics and provide an ultracompact interleaver arrangement. The size of the ring resonators 12, 14, 16, and 18, in this embodiment, are ring structures sized at 1 μm thick and 4 μm wide in diameter. However, the dimensions of the ring resonators can vary depending on the users needs. The more ultracompact ring structures that are used, the more the overall interleaver arrangement filtering characteristics will parallel that of a flat top filter at selective even and odd channel outputs.

Monolithic integration of the interleaver with two AWGs should be achieved since these components are on the same materials systems, processed by the same Si IC processing, and the footprints are extremely small. Furthermore, the ring structures used to form the inventive interleaver arrangement is not complex and can be integrated with any AWG cross talk system without requiring substantial costs and hardship.

Figure 2A:
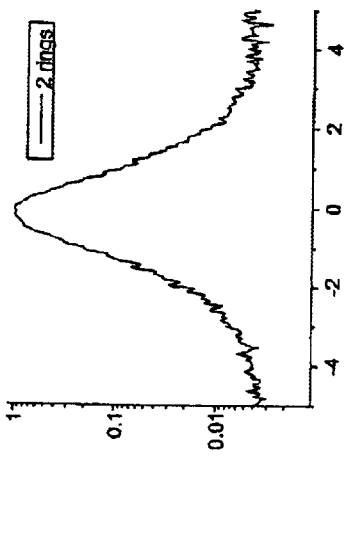
FIGS. 2A–2C are graphs demonstrating the filtering characteristics of the interleaver arrangement in accordance with the invention.
Figure 2B:
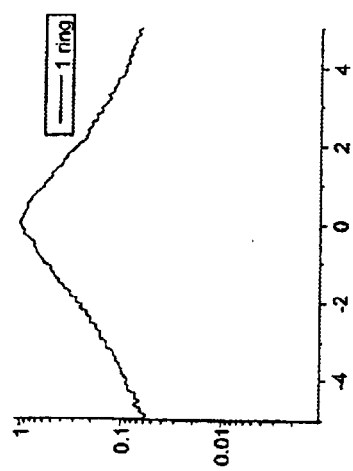
Figure 2C:
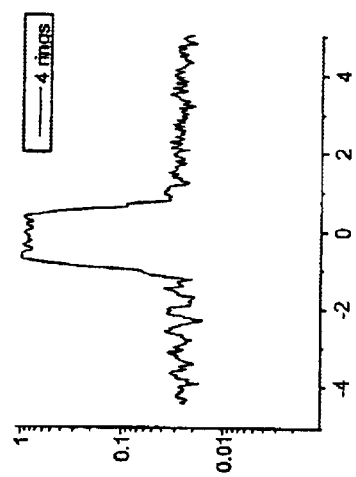

FIGS. 2A–2C are graphs demonstrating the filtering characteristics of the inventive interleaver arrangement. In particular, FIGS. 2A–2C show various filtering characteristics of the inventive interleaver arrangements having one, two, and four ring resonators. FIG. 2A shows the least favorable filtering characteristic for use in an interleaver. Note that FIG. 2A represents the filtering characteristics of a standard interleaver. FIG. 2B shows remarkable improvement over FIG. 2A and attempts to demonstrate filtering characteristics close to that of a flat top filter. The arrangement of FIG. 2B includes a two-ring structure. Furthermore, FIG. 2C shows a remarkable improvement over FIG. 2B and demonstrates flat top filtering characteristics. Thus, this proves that the more ultracompact ring structures being used the closer the interleaver arrangement filtering characteristics approach that of a flat top filters. All graphs are centered around 1.55 um.

Although the present invention has been shown and described with respect to several preferred embodiments thereof, various changes, omissions and additions to the form and detail thereof, may be made therein, without departing from the spirit and scope of the invention.

What is claimed is:

1. A system for performing crosstalk in AWGs comprising:
    a plurality of AWGs, wherein one of said AWGs receives an input signal, said AWGS are divided amongst a first selective group of said AWGs providing even-numbered channel outputs associated with an even-numbered selection of said input signal and a second selective group of said AWGs providing odd-numbered channel outputs associated with an odd-numbered selection of said input signal; and
    an interleaver arrangement including a plurality of ring structures so as to provide appropriate filtering characteristics for said even-numbered channel outputs and odd-numbered channel outputs.

2. The system of claim 1, wherein said interleaver arrangement comprises 4 ring structures.

3. The system of claim 1, wherein said ring structures comprise HIC optics.

4. The system of claim 2, wherein said ring structures are sized at 1 um thick and 4 um wide in diameter.

5. The system of claim 1, wherein said interleaver arrangement produces a crosstalk of −40 db.

6. A method of performing crosstalk in AWGs comprising:
    providing a plurality of AWGs, wherein one of said AWGs receives an input signal, said AWGS are divided amongst a first selective group of said AWGs providing even-numbered channel outputs associated with an even-numbered selection of said input signal and a second selective group of said AWGs providing odd-numbered channel outputs associated with an odd-numbered selection of said input signal; and
    providing an interleaver arrangement including a plurality of ring structures so as to provide appropriate filtering characteristics for said even-numbered channel outputs and odd-numbered channel outputs.

7. The method of claim 1, wherein said interleaver arrangement comprises 4 ring structures.

8. The method of claim 1, wherein said ring structures comprise HIC optics.

9. The method of claim 2, wherein said ring structures are sized at 1 um thick and 4 um wide in diameter.

10. The method of claim 1, wherein said interleaver arrangement produces a crosstalk of −40 db.

* * * * *